March 30, 1965   A. ECKERFELD ETAL   3,176,113
ELECTRICALLY HEATED HOT WATER APPARATUS HAVING A THERMOSTAT
Filed Aug. 28, 1961   2 Sheets-Sheet 1

Alfred Eckerfeld
Leonid Schumann,
INVENTORS

BY
Danbo, Robertson & Vandelagh

United States Patent Office 3,176,113
Patented Mar. 30, 1965

3,176,113
ELECTRICALLY HEATED HOT WATER APPARATUS HAVING A THERMOSTAT
Alfred Eckerfeld, 43 Bokenbusch, Langenberg, Rhineland, Germany, and Leonid Schomann, Wuppertal-Elberfeld, Germany; said Schomann assignor to said Eckerfeld
Filed Aug. 28, 1961, Ser. No. 134,507
Claims priority, application Germany, Aug. 26, 1960, E 19,840
13 Claims. (Cl. 219—331)

This invention relates to an electrically heated hot water apparatus, wherein a heating coil immediately in contact with the water is provided in a heating channel. Such apparatus are particularly susceptible to overloading and water deficiency, as the heating coil at once burns through if it is not sufficiently cooled, for example due to the formation of vapor. Therefore, considerable difficulties are involved with the provision of a safety switch responding within fractions of a second, by which the power supply can be switched-off already before the heating coil burns through. It is well known, for this purpose, to place a thermostat within the upper portion of the heating channel which, upon increase of temperature, actuates a safety switch. Such a thermostat, however, does not respond quickly enough to a local overheating of the heating coil as, for example, caused by the formation of vapor bubbles.

In such apparatus, the invention, therefore, makes provision that an elongated thermostat extends along the heating coil within the heating channel.

With such a design and arrangement of the thermostat also local overheatings of the heating coil become directly effective so that a well-timed response of a safety switch can be achieved. In addition, the novel arrangement and design of the thermostat offers other advantages, for example that a thermostat of relatively large length can be provided without requiring much space. Such a thermostat may be used also for the regulation of the discharge temperature, if desired. Usually in such continuous-flow heaters a plastic body containing the heating channel is provided. In these cases the thermostat may be an expansion rod at one end thereof screwed into the plastic body, the coefficient of expansion of this rod being larger than that of the plastic body. The rod then forms an expansion thermostat in combination with the plastic body.

More advantageous is it, however, if, according to the invention the thermostat is a plastic tube having a high coefficient of expansion, which encloses the heating coil and forms an expansion body of an expnasion type thermostat. By this means, difficulties, which could arise due to the electric conductivity of a metallic expansion rod, are avoided and a good heat transmission from the coil to the thermostat at all sides is ensured.

There are plastics having a very high coefficient of expansion. For example, the coefficient of expansion of low pressure polyethylene is about ten times larger than that of brass. It has also been found that in the temperature range occurring in water heaters such plastics are perfectly useful as thermostat material, in particular that they do not show any interfering changes of the structure or fatigue phenomena and provide reproducible value.

The invention may also be reduced to practice in such a manner that the thermostat is a plastic body of high coefficient of expansion fixed at its one end and extending into the heating channel. The heating coil is wound on the said plastic body and the latter forms an expansion body of an expansion thermostat. It is often desired to fix the heating coil in the channel by means of an appropriate carrier. According to the invention this function is fulfilled by the expansion body of the thermostat, whereby, on the one hand, a separate heating coil carrier may be omitted, and, on the other hand, a particularly close contact between heating coil and expansion body is achieved. Therefore, the thermostat will respond very quickly to an overheating of the heating coil. It is desirable, in such thermostats, that the mass of the expansion body be very small, because a larger mass, of course, would cause a delay in the response of the thermostat. For this reason the plastic body advantageously is a tube, whereby the smallest possible mass is combined with the largest possible surface for the heat exchange between coil and expansion body. In order to achieve a favourable heat exchange between heating coil and water, it is advantageous that the heating coil helically wound from the heating wire is again helically wound around the tube. By this means, the heating coil is throughout surrounded by water from all sides and the power supply is uniformly distributed over a relatively large cross section of flow. In spite of this, an overheating will become effective at first on the thermostat-tube, because, at the inside, the windings are closest together. Such a thermostat at the same time serving as a heating coil carrier can, for example, be provided in such a manner, that the plastic body extends centrally downwards from a disc-shaped base body containing hot and cold water connections and is enclosed by a collar provided on the base body and extending beyond the lower end of the heating coil, that a bell-shaped body is fixed to the base body which together with the collar forms an annular channel, and that the inlet channel opens into said annular channel and the outlet channel opens inside the collar.

Furthermore, this invention relates to an expansion thermostat for water heaters. According to the invention this thermostat comprises an expansion body out of plastic material having a high coefficient of expansion, such as low pressure polyethylene. As has already been explained above, such material has a particular high coefficient of expansion and has all characteristics required for a thermostat for water heaters. It is advantageous in electrically heated continuous-flow heaters that the plastics are not electrically conducting.

Two embodiments of the invention are shown in the accompanying drawings and are described in the following specifications:

Figure 1:
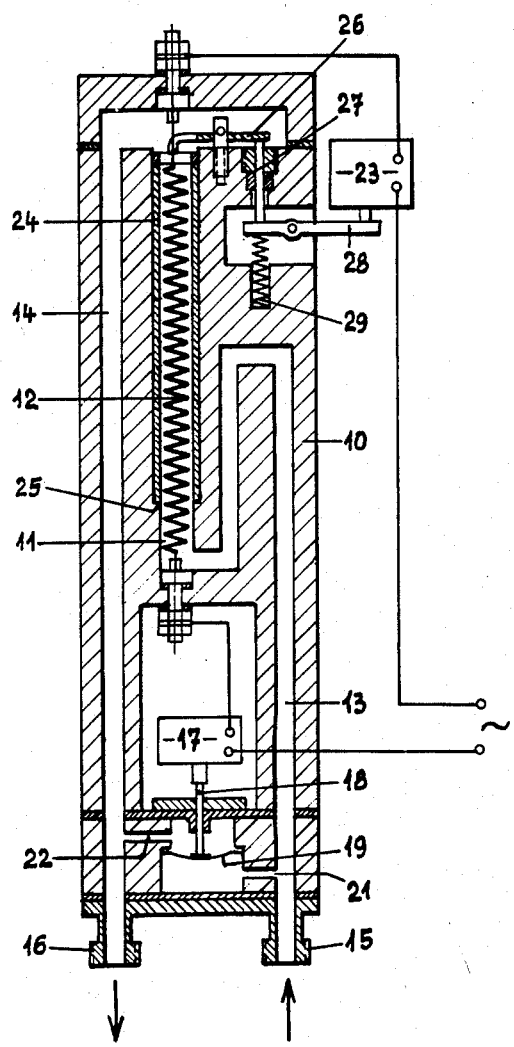
FIG. 1 shows schematically a cross section of a continuous-flow heater of the invention.
Figure 2:
FIG. 2 shows a plan view after removal of the top cover.

A heating channel 11 is provided in a block-shaped plastic body 10. A heating coil 12 is placed in the heating channel 11. Coil 12 is immediately and without insulation in contact with water. Resistor channels 13 and 14 are connected in series with channel 11. The water columns in these channels form electric resistors which limit the leakage currents and permit grounding of the inlet 15 and of the outlet 16, though the heating coil 12 lies in the water uninsulated.

The power supply is under the control of a switch 17 which is actuated through a pusher-rod 18 by a snap-diaphragm 19. The inlet pressure is directed to the one side of the diaphragm 19 through a channel 21 and the discharge pressure is directed to the other side through a channel 22. The switch 17 is closed as soon as water is tapped.

Besides this a safety switch 23 is provided. This switch is under the control of a thermostat. The thermostat comprises an expansion body in the form of a tube 24, which is arranged in the heating channel 11 and encloses the heating coil 12 practically on its whole length. The tube consists of low pressure polyethylene, which has a considerably higher coefficient of expansion than the channel block 10. It rests on a shoulder 25 of the channel block 10, extends out of the heating channel 11 at the top thereof. When the coil 12 is overheated at any spot, for example due to the formation of vapor in channel 11, the tube 24 expands and pushes on a lever 26 which is pivoted at the channel block 10. The lever 26 pushes on a lever 28 through the action of a spring 29 through a sealingly guided pusher rod 27. This lever 28 actuates the switch 23 which interrupts the power supply to the heating coil 12. By the design and arrangement of the thermostat tube 24, overheating of the heating coil at any portion thereof effects a quick switching-off, so that burning-through of the coil 12 is prevented.

Figure 3:
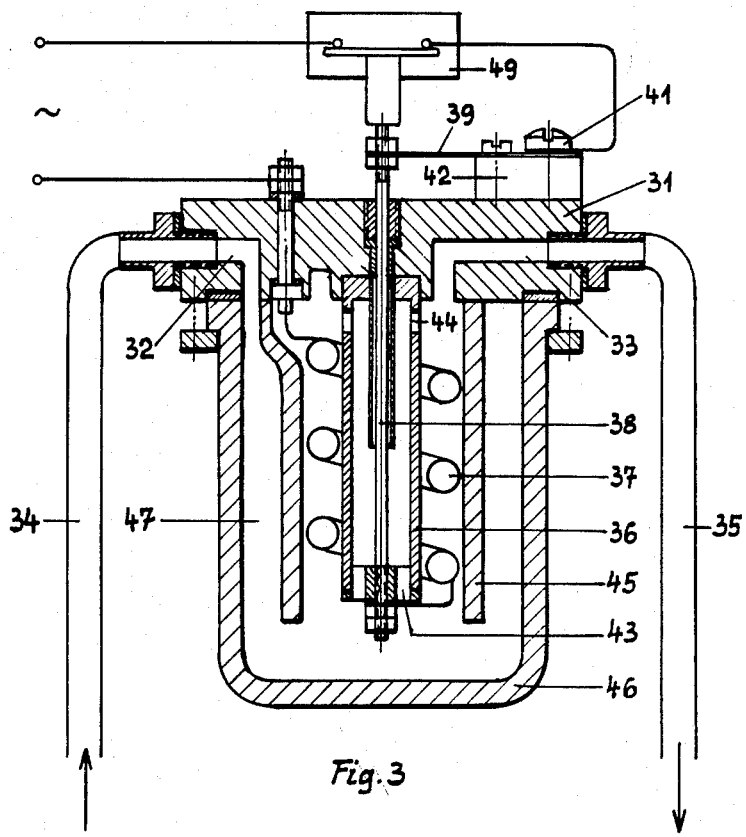
FIG. 3 shows another embodiment of a continuous-flow heater.
Figure 4:
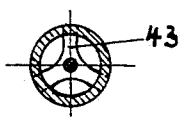
FIG. 4 shows a detail thereof.

In the embodiment of the invention according to FIGS. 3 and 4, a base body 31 is provided, which contains an inlet and an outlet channel 32 and 33, respectively. Plastic or rubber hoses 34 and 35, respectively, are connected to the channels, which contain resistor channels (like 13 and 14 in FIG. 1). Centrally below the base body 31, a tube 36 out of low pressure polyethylene is provided. A heating coil 37 is wound around the tube 36. This coil consists of a helical winding which again is helically wound around the tube 36. A brass rod 38 extends centrally through the tube 36. Rod 38 is sealingly guided through the base body 31 and is fixed to a leaf spring 39. The leaf spring 39 is fixed to an insulating body 42 by means of a screw 41. Body 42 is positioned on the top surface of the base body 31. Leaf spring 39 pulls the rod 38 upwards, so that it abuts the tube 36 with a spider 43 (see FIG. 4) affixed to its lower end. Tube 36 is provided with lateral openings 44 in its upper portion.

The tube 36 with the heating coil 37 is enclosed by a collar 45, which extends beyond the lower end of the heating coil. The whole is covered by a bell-shaped body 46 attached to the base body from below, body 46 forming a jacket-shaped annular channel 47. The inlet channel 32 opens into this annular channel, whereas the outlet channel opens inside the collar 45 into an annular space 48.

The rod 38 acts on a switch 42, which controls the current supply to the heating coil 37. The current supply is effected through the switch 49, the leaf spring 39 and the rod 38 to the heating coil 37.

The device described operates as follows:

When the tap valve (not shown) is opened, cold water flows through the channel 32 and annular channel 47 to the heating coil 37. Thereby the tube 36 acting as the expansion body of a thermostat is shortened, rod 38 is moved upwards and closes the switch 49. The heating coil 37 gets current. When the tap valve has been closed, the resting water inside collar 45 is quickly heated beyond normal operating temperature, so that the tube 36 expands and through rod 38 opens the switch 49.

If the heating coil has been considerably overheated due to formation of vapor or due to water deficiency, a strong and quick expansion of the tube 36 is effected, because the heating coil is wound immediately on the tube 36. The current is then switched off within a fraction of a second, so that a burning through of the heating coil 37 is prevented.

By this means, the plastic tube 36 acts both as a water deficiency safety device and as a safety switch.

Depending upon the volume of the bell-shaped body 46, the apparatus may be used as a continuous-flow heater or as a boiler. In the latter case, the tube serves also to maintain the stored water permanently at a selected temperature.

The structure described offers the further advantage that during operation as a continuous-flow heater always a jacket 47 of cold water is provided at the outside, so that the outer wall of the apparatus remains cool, even if nearly boiling water is tapped.

What we claim is:

1. In a highly loaded apparatus for the continuous-flow heating of water and having a switch, a body with a heating channel having an electrical resistance heating member therein comprising a bare heating element in direct contact with the flowing water, said member defining an elongated axis and being adapted to be connected to a source of power through said switch to control the flow of electric power to the heating member, the improvement comprising: thermostatic means including a thermally responsive expansion member in contact with said flowing water and operatively connected to said switch to actuate the same, said expansion member having a longitudinal axis and a length along said axis at least equal to the approximate length of said heating member along its axis, said members being positioned with their axes generally parallel, with one being immediately adjacent the other throughout their length, and without other obstruction between the members so that the expansion member will respond to localized overheating of the heating member.

2. In an apparatus as set forth in claim 1 wherein said expansion member is a plastic tube having a relatively high coefficient of expansion, said tube surrounding said heating member while permitting the water to be heated to come into contact with said heating member.

3. In an apparatus as set forth in claim 2 wherein the portion of said body defining said heating channel is formed of a material having a coefficient of expansion smaller than the coefficient of expansion of said plastic tube, means operatively connecting one end of said tube with said switch, said body having means to restrain the other end of the tube against movement in a direction away from said one end.

4. In an apparatus as set forth in claim 3 wherein said body includes an internal opening at the end of the heating channel adjacent said one end of said tube, said means operatively connecting said one end of said tube and said switch including a lever in said opening and pivotally connected to the body, one end of said lever being in contact with said one end of said tube, and means operatively connecting said lever to said switch.

5. In an apparatus as set forth in claim 1 wherein said expansion member is formed of plastic having a relatively high coefficient of expansion, said heating member being wound on said expansion member.

6. In an apparatus as set forth in claim 5 wherein said rod is hollow in the form of a tube.

7. In an apparatus as set forth in claim 6 wherein said heating member is in the form of an elongated helical coil of wire, with the coil in turn being helically positioned around the tube.

8. In an apparatus as set forth in claim 6 wherein said thermostatic means includes a transmission member extending centrally through said tube, said transmission member having a coefficient of expansion different from the coefficient of expansion of the plastic of said expansion member, said tube being anchored to the body at one end thereof and to the transmission member at the other end thereof, said transmission member being operatively connected to said switch to actuate the same.

9. In an apparatus as set forth in claim 8 wherein the transmission member is formed of metal and serves as a conductor for the heating member.

10. In an apparatus as set forth in claim 5 wherein said body comprises a disc-shaped portion having the plastic expansion member and the heating member extending downwardly from the central portion thereof, a collar extending downwardly from the disc-shaped portion to a point below the lower end of the heating member and surrounding the expansion member and the heating member, and a bell-shaped portion spaced from the collar externally of the collar and mating with the disc-shaped portion to define an annular channel externally of the collar, said disc portion having an inlet connection opening into said annular channel and an outlet connection opening into the space within said collar.

11. In an apparatus as set forth in claim 1 wherein said expansion member is formed of low pressure polyethylene.

12. In a highly loaded apparatus for the continuous-flow heating of water and having a switch, a body with a heating channel having an electrical resistance heating member therein comprising a bare heating element in direct contact with the flowing water, said member being adapted to be connected to a source of power through said switch to control the flow of electric power to the heating member, the improvement comprising: thermostatic means including a thermally responsive expansion member in contact with said flowing water and operatively connected to said switch to actuate the same, one of said members defining a hollow tube having given internal dimensions and formed about an elongated longitudinal axis, the other of said members being smaller in cross-sectional dimensions than said given dimensions and being positioned in said tube and without other obstruction between the members so that the expansion member will respond to localized overheating of the heating member, said members being approximately equal in length and being positioned with their ends approximately in juxtaposition.

13. In an apparatus as set forth in claim 10 wherein said expansion member has laterally openings in the upper portion thereof and below the disc-shaped portion.

References Cited by the Examiner
UNITED STATES PATENTS

| | | | |
|---|---|---|---|
| 1,053,550 | 2/13 | Wright et al. | 219—331 |
| 1,265,213 | 5/18 | Knopp | 219—331 |
| 1,715,687 | 6/29 | Vaughan | 219—331 X |
| 1,764,139 | 6/30 | Alex | 219—331 X |
| 2,799,748 | 7/57 | Stump | 200—137 |

FOREIGN PATENTS

| | | |
|---|---|---|
| 620,384 | 3/49 | Great Britain. |
| 620,838 | 3/49 | Great Britain. |
| 715,922 | 9/54 | Great Britain. |
| 75,334 | 9/32 | Sweden. |
| 901,091 | 9/54 | Germany. |

RICHARD M. WOOD, *Primary Examiner.*

MAX L. LEVY, ANTHONY BARTIS, *Examiners.*